Jan. 7, 1969  J. DECKER  3,420,009
WORK CENTERING CHUCK
Filed July 11, 1966  Sheet 2 of 2

//united States Patent Office 3,420,009
Patented Jan. 7, 1969

3,420,009
WORK CENTERING CHUCK
Jacob Decker, Cincinnati, Ohio, assignor to The Cincinnati Milling Machine Co., Cincinnati, Ohio, a corporation of Ohio
Filed July 11, 1966, Ser. No. 564,087
U.S. Cl. 51—237     6 Claims
Int. Cl. B24b 41/06

ABSTRACT OF THE DISCLOSURE

This specification and referenced drawings describe and show a chuck-type work driver for a precision cylindrical grinding machine in which a plurality of gripping jaws move radially inward to grip the end of a workpiece that is held on a fixed axis by a conventional locating conical center mating with a center hole in the end of the workpiece. The jaws move toward a theoretical center which is permitted to shift as the jaws engage the work so that the workpiece is firmly and uniformly gripped despite an eccentricity of the workpiece relative to the locating center and centerhole.

---

This invention relates to chuck type work drivers which are used in connection with such machine tools as center type grinding machines.

One object of this invention is the provision of a work driver that can be easily and quickly operated by automatic remote controls to be placed in driving engagement with the workpiece as it is held between centers.

Another object is the provision of a driver device which will adjust itself to slight eccentricities in the periphery of a workpiece relative to a predetermined center line defined by the work supporting centers without impairing the accuracy of the machining operation and without changing the gripping pressure of the workpiece.

Another object is to provide a device which is conveniently and easily adjustable from the exterior to alter it to grip work of a specific size.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form the present invention utilizes a set of three, equi-spaced, radially movable jaws that are actuated forcefully and in unison to move against and to grip a workpiece that is inserted between them. The structure that controls the radial movement of the jaws is itself movable over a range of positions in a plane parallel to the radial direction of movement of the gripping jaws so that the theoretical center toward which the jaws move in unison is permitted to shift. This center is defined as a center from which the paths of movement of the jaws radiate. In this manner the mechanism adjusts itself to accommodate eccentricities and irregularities in the work while each of the plural jaws is held against the work with a force equal to that exerted by the other jaws.

A clear understanding of the construction and operation of this invention can be obtained from the following detailed description in which reference is made to the attached drawings wherein.

Figure 1:
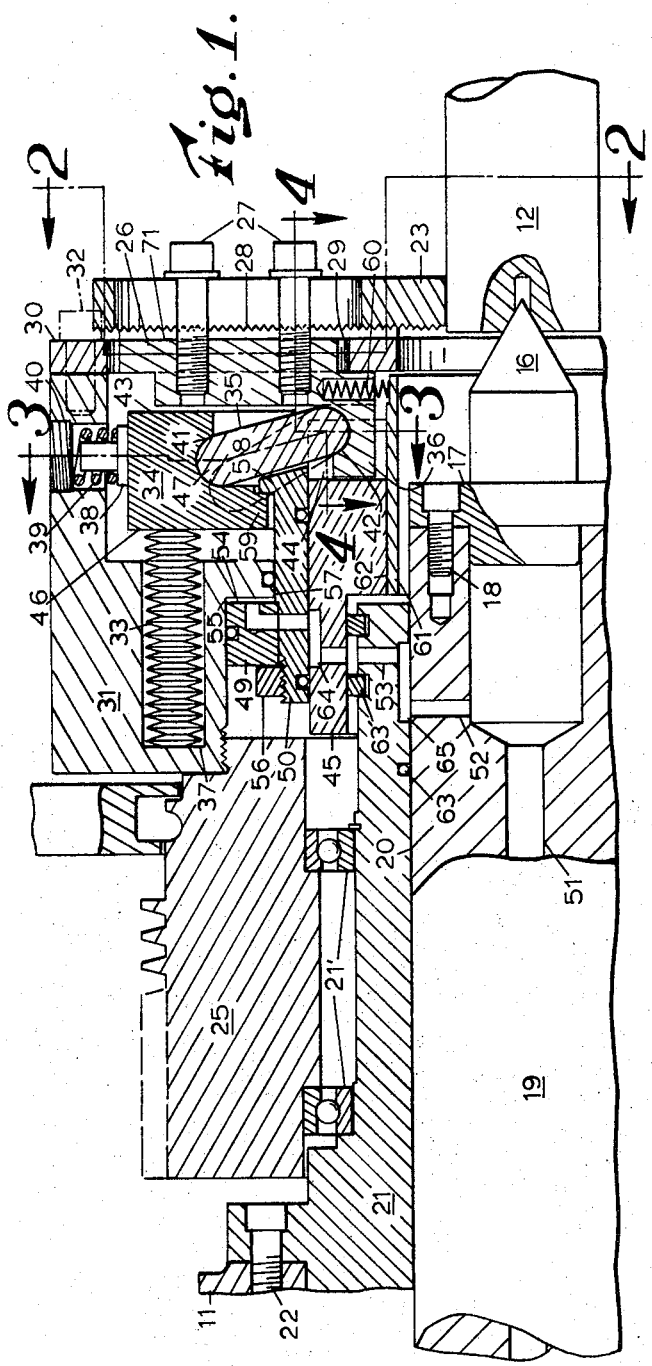
FIG. 1 is a sectional view of the work chuck driver of this invention shown in the gripping position.
Figure 2:
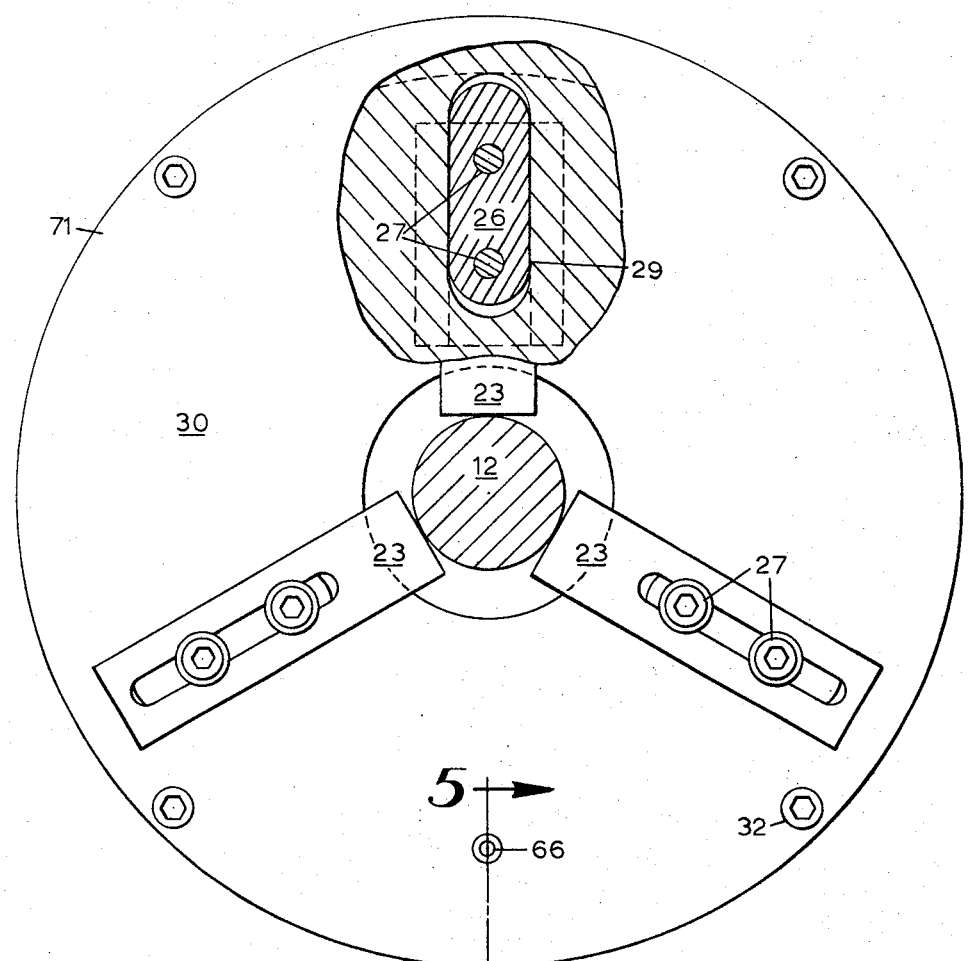
FIG. 2 is a view partly in elevation and partly in section taken on a line 2—2 of FIG. 1.
Figure 3:
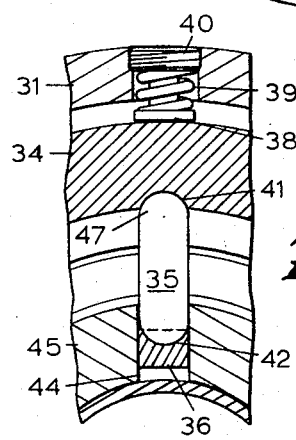

FIG. 3 is a sectional view taken on line 3—3 of FIG. 1.
FIG. 4 is a sectional view taken on line 4—4 of FIG. 1.
FIG. 5 is a sectional view taken on line 5—5 of FIG. 2.

The specific embodiment of a chuck driver mechanism constructed in accordance with this invention and to be described in detail hereinafter is shown mounted as a unit on the headstock 11 of a center type grinding machine. The machine goes through a conventional automatic cycle (under control of conventional cycle control circuitry, not shown) including the steps of loading, centering, clamping for rotating, machining, releasing and unloading of a workpiece 12. The mechanism of this invention operates in combination with a centering and holding member that supports a workpiece to grip and drive the workpiece and, at the end of an operation, to release itself from the workpiece so that it can be removed from the machine. Therefore the chuck driver mechanism is comprised of two functional sections, including a gripping and driving unit and a releasing unit, combined with the centering and holding unit.

The centering and work holding unit comprises a headstock center 16 which acts in concert with a footstock center (not shown) to hold the workpieces on a predetermined center line. The center 16 is secured by a flange 17 and bolts 18 to a dead spindle 19. The dead spindle 19 is reciprocably movable longitudinally in a bore 20 in a housing 21 which serves to support the work chuck driver on the headstock 11 by means of bolts 22. In order to release the workpiece 12, the spindle 19 and center 16 are reciprocated to the left away from the workpiece 12 as viewed in FIG. 1 by automatic means (not shown) in the headstock 11. Upon the presentation of a new workpiece 12 to the position shown the center 16 and spindle 19 are moved back to the right to engage the workpiece 12 at its center hole to hold it on the predetermined center line.

The gripping and driving portion of the mechanism is comprised of a set of at least three jaws 23, a spring and toggle mechanism for exerting pressure on the jaws 23 to grip the workpiece 12 and a power driven sheave 25 that provides the means for rotating the workpiece 12 when it is firmly gripped by the jaws 23. The jaws 23 are adjustably secured to slides 26 by bolts 27 and mating serrations 28 in the jaws 23 and the slides 26. Thus, the jaws may be adjusted initially with regard to the outside diameter of the work 12. As shown in FIG. 2 the slides 26 and the jaws 23 are radially disposed with regard to the center 16 and are equally spaced angularly therearound. In order that the jaws 23 may adjust themselves to slight eccentricities in the periphery of the workpiece 12, the slides 26 are mounted for movement in slots 29 in a face plate 30. The face plate 30 is secured by bolts 32 to a housing 31 containing the spring and toggle mechanism and the housing 31 is in turn secured to and rotates with the power driven sheave 25 which is journaled on bearings 21' contained in housing 21.

The spring and toggle mechanism includes three spaced stacks of Belleville spring washers 33, a floating control member in the form of a ring 34, three toggle pins 35 and lugs 36 on the slides 26. The three stacks of springs 33 are equally spaced angularly and are seated in counterbores 37 in the housing 31. The floating ring 34 is suspended centrally with regard to the center 16 between at least three spring urged studs 38 equally spaced angularly around the center 16 also. The studs 38 are urged toward the ring 34 by springs 39 adjustably retained in the housing 31 by set screws 40. The set screws 40 are initially adjusted to produce equal compression of the springs 39 so that the floating ring 34 tends to be held concentric with the center 16. In this condition the jaws 23 will be moved along paths radiating from the center line of the center 16 which is the axis on which the work 12 will be rotated during a machining operation.

The three toggle pins 35 have rounded ends adapted to be seated in sockets 41 in the ring 34 and sockets 42 in the lugs 36. As shown in FIG. 1, the toggle pins 35 are disposed at a slight angle from the face 43 of the ring 34 when the jaws 23 are in the gripping position. As shown in FIG. 3, the toggle pins 35 are arranged radially in regard to the center 16 and are prevented from turning with respect to the sockets 42 by radial slots 44 in a sleeve 45. Normally, the springs 33 exert pressure forwardly (toward the face plate 30) against a face 46 of the ring 34, thus holding the ring 34 and the outer ends 47 of the toggle pins 35 in their forward position as shown in FIG. 1. In this position the toggle pins 35 act as levers to exert pressure forwardly and inwardly (toward the center 16) on the slides 26. This inward pressure causes the jaws 23 to grip the workpiece 12 while forward movement of the slides 26 is prevented by flanges 48 on the slides 26 which press against the face plate 30. If the work 12 is out of round or eccentric with respect to the center 16, one of the jaws 23 will engage the work 12 before the others and the balanced forces acting radially on the floating ring 34 will be unbalanced to cause it to shift to a new position and therefore also to shift the center toward which the jaws 23 are moved. The unbalance of forces on the ring 34 will ultimately be balanced when all of the jaws 23 are held against the workpiece 12 with equal pressure.

The releasing unit comprises a linear motor including a piston 49 slidably received in a chamber 55 in the housing 31, a retraction sleeve 50 to which the piston 49 is secured by a nut 56, and the floating ring 43. When the machining operation is finished, pressurized air (from a supply source not shown) is automatically admitted through passages 51 and 52 in the spindle 19 to a series of passages 53 in the housing 21 and in sleeves 45 and 50 terminating at the face 54 of the piston 49. The piston 49 is moved rearwardly in the chamber 55 and the retraction sleeve 50 is moved rearwardly in a bore 57 in the housing 31. The retraction sleeve 50 has on its forward end an external annular flange 58 designed to engage an internal annular flange 59 in the ring 34, so when the piston 49 is moved rearwardly the floating ring 34 is also moved rearwardly until the ring 34 abuts the housing 31. Thus the forward pressure of the springs 33 against the ring 34 and the toggle pins 35 will be overcome rendering the slides 26 and the jaws 23 free to return to their outward positions thereby releasing the workpiece 12. The jaws 23 are urged outwardly by springs 60 seated in the slides 26 and pressing against a bushing 61 retained in a bore 62 in the sleeve 45.

It should be noted that all of the air passages from the spindle 19 to the sleeve 50 except the passage 53 are sealed against leakage by appropriate seals such as for example the seal ring 63. Because the sleeve 45 is rotatable with regard to the housing 21 it is preferable to provide expansion type piston rings 63' as seals for the passage 53, as shown. Also due to the longitudinal movement of the sleeve 50 relative to the sleeve 45 and of the spindle 19 relative to the housing 21, annular grooves 64 and 65 in the pressurized air transmission circuit are provided and these are of sufficient width to accommodate the relative forward and rearward movement described.

In FIG. 5 there is shown an indicator for providing a visual display corresponding to the longitudinal position of the floating ring 34 with regard to the face plate 30 and consequently the angular positions of the toggle pins 35 with regard to the face plate 30. A pin 66 having a head 67 is reciprocally held in a hole 68 in the face plate 30 and is maintained in contact with the floating ring 34 by a spirng 69. The pin 66 is made of such length that an end face 70 will be flush with the face 71 of the face plate 30 when the toggle pins are at the required angle to move the jaws 23 against the workpiece 12 when the jaws 23 are at a position approximately midway between the outermost and innermost positions thereof. This insures that adequate clamping pressure will be exerted on the work 12 which normally will vary slightly in size from piece to piece and if the face 70 should extend appreciably beyond the face surface 71 the machine operator will be advised of the possibility that the jaws 23 may not be exerting adequate pressure on the work 12 by virtue of their being at the limit of their inward movement determined by the length of the slots 29. The necessity of a readjustment of the jaws 23 on the slides 26 will be indicated by the exposure of the end face 70 appreciably beyond the face 71 which can be easily accomplished as previously described.

From the above description it can be seen that a work chuck driver mechanism has been provided which includes a floating spring actuated gripping mechanism capable of self adjustment to accommodate varying amounts of eccentricity in the peripheries of workpieces as they are presented to the machine one after another. The mechanism is further easily adjustable to change the size of work to be handled by it.

What is claimed is:

1. In a machine tool having a center member therein adapted to engage and hold one end of a workpiece for rotation on a fixed axis, a driving chuck comprising:
   (a) a chuck housing supported in the machine tool for rotation around the fixed axis,
   (b) a control member symmetrical about a center thereof,
   (c) bias means for yieldably holding said control member in said chuck housing and around the center member to permit limited movement in a direction transverse to the fixed axis and along the direction of the fixed axis,
   (d) a set of jaws,
   (e) a set of toggle levers connected between said control member and said jaws,
   (f) means for holding said jaws at spaced locations around said control member and for limited movement radially toward and away from said center thereof at a fixed location along the fixed axis in a plane transverse to the fixed axis, and
   (g) actuating means for shifting said control member toward said jaws to swing said toggle levers and to move said jaws simultaneously and radially inward toward the center of said control member, said control member shifting in the transverse direction in said housing against said bias means when said jaws engage the workpiece with unequal pressure until said pressures are equalized.

2. The apparatus of claim 1 wherein:
   (a) said actuating means produces a constant force tending to move said control member toward said jaws,
   (b) means are provided selectively to produce a force on said control member greater than said constant force and acting in a direction opposite thereto to shift said control member away from said jaws, and
   (c) constant bias means are provided for producing yieldable forces tending to move said jaws radially outward from said control member center to hold said toggle levers in an operative relation between said control member and said jaws and for radial outward movement of said jaws when said control member is moved away therefrom.

3. The apparatus of claim 1 wherein:
   (a) said means for holding the jaws includes a set of slide members received in said chuck housing for limited movement radially toward and away from said control member center,
   (b) means are provided for attaching said jaws to said slide members at selected positions thereon, and
   (c) said control member and slide members have sockets formed therein and said toggle levers are received therebetween.

4. The apparatus of claim 1 wherein:
(a) said control member is an annular member received around the center member in said chuck housing both for limited movement transverse to the fixed axis and for limited movement along the fixed axis,
(b) said actuating means includes mechanical toggle linkages acting in response to movement of said control member in one direction along the fixed axis and means for producing a constant axial force acting on said control member for movement thereof in said one direction, and
(c) release means are provided selectively to produce a force on said control member greater than and opposite to said constant axial force for movement thereof in the other direction along the fixed axis to reverse the radial movement of said jaws.

5. The apparatus of claim 4 wherein:
(a) said release means is a linear motor connected to said control member for movement thereof in said other direction along the fixed axis when energized, and
(b) said actuating means is a plurality of springs spaced around said control member and compressed between said chuck housing and said control member.

6. The apparatus of claim 5 wherein:
(a) said means for holding the jaws is a plurality of slide members equiangularly spaced around the center member in said chuck housing and slidable in radial paths toward and away therefrom,
(b) said jaws are releasably attachable thereto at selected locations, and
(c) said mechanical toggle linkages are connected between said control member and said slide members and are operative to shift said slide members radially inward when said control member is moved in said one direction along the fixed axis.

References Cited

UNITED STATES PATENTS

| 2,693,365 | 11/1954 | Zelewsky. | |
| 2,852,265 | 9/1958 | Dinen | 279—119 |
| 2,854,239 | 9/1958 | Lammens | 279—119 |
| 2,867,443 | 1/1959 | Swanson | 279—119 |

HAROLD D. WHITEHEAD, *Primary Examiner.*

U.S. Cl. X.R.

279—118